United States Patent
Dufour et al.

(10) Patent No.: US 12,352,159 B2
(45) Date of Patent: Jul. 8, 2025

(54) WIRELESS ELECTRICAL LOWER COMPLETION DEPLOYMENT

(71) Applicant: Schlumberger Technology Corporation, Sugar Land, TX (US)

(72) Inventors: Yann Dufour, Rosharon, TX (US); Fernando Garcia-Osuna, Sugar Land, TX (US); Cassius Alexander Elston, Shreveport, LA (US); Samuel Domingos Leal, Taubate (BR); Lucas Henrique Vieira, Taubate (BR); Hubert Monthe Ngakam, Taubate (BR); Ricardo Sis Moreira, Taubate (BR); Wendell Pereira Da Silva, Taubate (BR); Luis Parra, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/714,256

(22) PCT Filed: Dec. 8, 2022

(86) PCT No.: PCT/US2022/081172
§ 371 (c)(1),
(2) Date: May 29, 2024

(87) PCT Pub. No.: WO2023/108064
PCT Pub. Date: Jun. 15, 2023

(65) Prior Publication Data
US 2025/0027408 A1 Jan. 23, 2025

Related U.S. Application Data

(60) Provisional application No. 63/265,100, filed on Dec. 8, 2021.

(51) Int. Cl.
*E21B 23/00* (2006.01)
*E21B 47/14* (2006.01)
*F16L 51/00* (2006.01)

(52) U.S. Cl.
CPC .............. *E21B 47/14* (2013.01); *E21B 23/00* (2013.01); *F16L 51/00* (2013.01)

(58) Field of Classification Search
CPC .......... E21B 47/14; E21B 23/00; F16L 51/00
See application file for complete search history.

(56) References Cited

U.S. PATENT DOCUMENTS

| | | | | |
|---|---|---|---|---|
| 2009/0173493 A1* | 7/2009 | Hutin | ..................... | E21B 17/028 |
| | | | | 166/250.01 |
| 2011/0297393 A1* | 12/2011 | Patel | ....................... | E21B 34/08 |
| | | | | 166/325 |
| 2014/0374088 A1* | 12/2014 | Kruspe | ............... | E21B 41/0085 |
| | | | | 166/244.1 |
| 2016/0319087 A1* | 11/2016 | Niihara | ..................... | C08J 5/045 |
| 2017/0167248 A1* | 6/2017 | Dufour | ............... | E21B 17/0283 |

(Continued)

*Primary Examiner* — Taras P Bemko
(74) *Attorney, Agent, or Firm* — Jeffrey D. Frantz

(57) ABSTRACT

Systems and methods for wireless deployment of electrical lower completions are provided. A wet disconnect tool-running tool includes a battery and telemetry section, and electronics and sensors section, and a pressure compensator and control lines section.

13 Claims, 4 Drawing Sheets

(56) References Cited

U.S. PATENT DOCUMENTS

| | | | | |
|---|---|---|---|---|
| 2017/0247953 | A1* | 8/2017 | Rayssiguier | E21B 17/105 |
| 2018/0283136 | A1* | 10/2018 | Poluchalla | E21B 43/14 |
| 2023/0188167 | A1* | 6/2023 | Wilenski | H04B 7/0617 |
| | | | | 340/854.3 |
| 2024/0318539 | A1* | 9/2024 | Steele | E21B 17/028 |
| 2024/0337185 | A1* | 10/2024 | McLauchlan | E21B 17/028 |

* cited by examiner

WIRELESS ELECTRICAL LOWER COMPLETION DEPLOYMENT

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage Entry of International Application No. PCT/US2022/081172, filed Dec. 8, 2022, which claims priority benefit of U.S. Provisional Application No. 63/265,100, filed Dec. 8, 2021, the entirety of which is incorporated by reference herein and should be considered part of this specification.

BACKGROUND

Field

The present disclosure generally relates to wireless tools, systems, and methods for deploying electrical lower completions.

Description of the Related Art

Hydrocarbon fluids such as oil and natural gas are obtained from subterranean geological formations, which are referred to as reservoirs. To recover hydrocarbons from a reservoir, a well that penetrates the reservoir can be drilled After the well is drilled, a well completion assembly can be used to complete the well before hydrocarbons can be produced. The well completion assembly is often installed in the well using a running-tool.

SUMMARY

In some configurations, a wet disconnect tool-running tool includes: a battery and telemetry section; an electronics and sensors section; and a pressure compensator section.

The battery and telemetry section can include a modem for acoustic wireless telemetry. The modem can be wired to the electronics and sensors section. The battery and telemetry section can include a plurality of battery cells, each of the plurality of battery cells encapsulated in an individual tube. The plurality of battery cells can be disposed circumferentially about a central core or mandrel of the battery and telemetry section. The battery and telemetry section can include a modem for wireless telemetry, and the modem can be disposed alongside and/or parallel to the plurality of battery cells. The electronics and sensors section can include an electronic chassis mounted on a mandrel, and a sleeve mounted on the chassis to seal and create an air chamber for the electronics. The electronics and sensors section can include a read out port. The electronics and sensors section can include a pressure/temperature sensor. The pressure compensator section can include a spring-based pressure compensator system. The spring-based pressure compensator system can be configured to add positive pressure in chemical injection lines, compensate for thermal expansion and/or contraction, compensate for hydrostatic and/or applied pressure from surface to tubing, and maintain a differential pressure between tubing and the chemical injection lines within a desired limit.

In some configurations, a pressure compensator system includes a mandrel; a housing; a piston; a spring; a fluid chamber defined by the mandrel, the housing, and one side of the piston; and a spring chamber defined by the mandrel, the housing, and an opposite side of the piston, the spring disposed in the spring chamber. Chemical lines are coupled to the fluid chamber.

The fluid chamber can be filled with fluid prior to use. Filling the fluid chamber moves the piston toward the spring chamber, thereby compressing the spring, to limit pressure in the chemical lines. As the fluid contracts in use, the spring expands to move the piston toward the fluid chamber to compensate for fluid volume loss. As the fluid re-expands in use, the piston is forced toward the spring chamber against the spring.

In some configurations, a method of deploying an electric lower completion includes coupling a WDT-RT to an electric lower completion; and using a modem of the WDT-RT to communicate to a surface acquisition system via wireless telemetry.

The method can further include compensating for thermal expansion and/or contraction of fluid in chemical lines using a pressure compensator system of Claim WDT-RT. The method can include the WDT-RT communicating to the surface acquisition system via acoustic wireless telemetry. The method can include powering the WDT-RT via a plurality of battery packs of the WDT-RT. The method can include using a read-out port of the WDT-RT to configure the WDT-RT before running in hole and to dump data after completing installation of the electric lower completion.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

DETAILED DESCRIPTION

Figure 1:
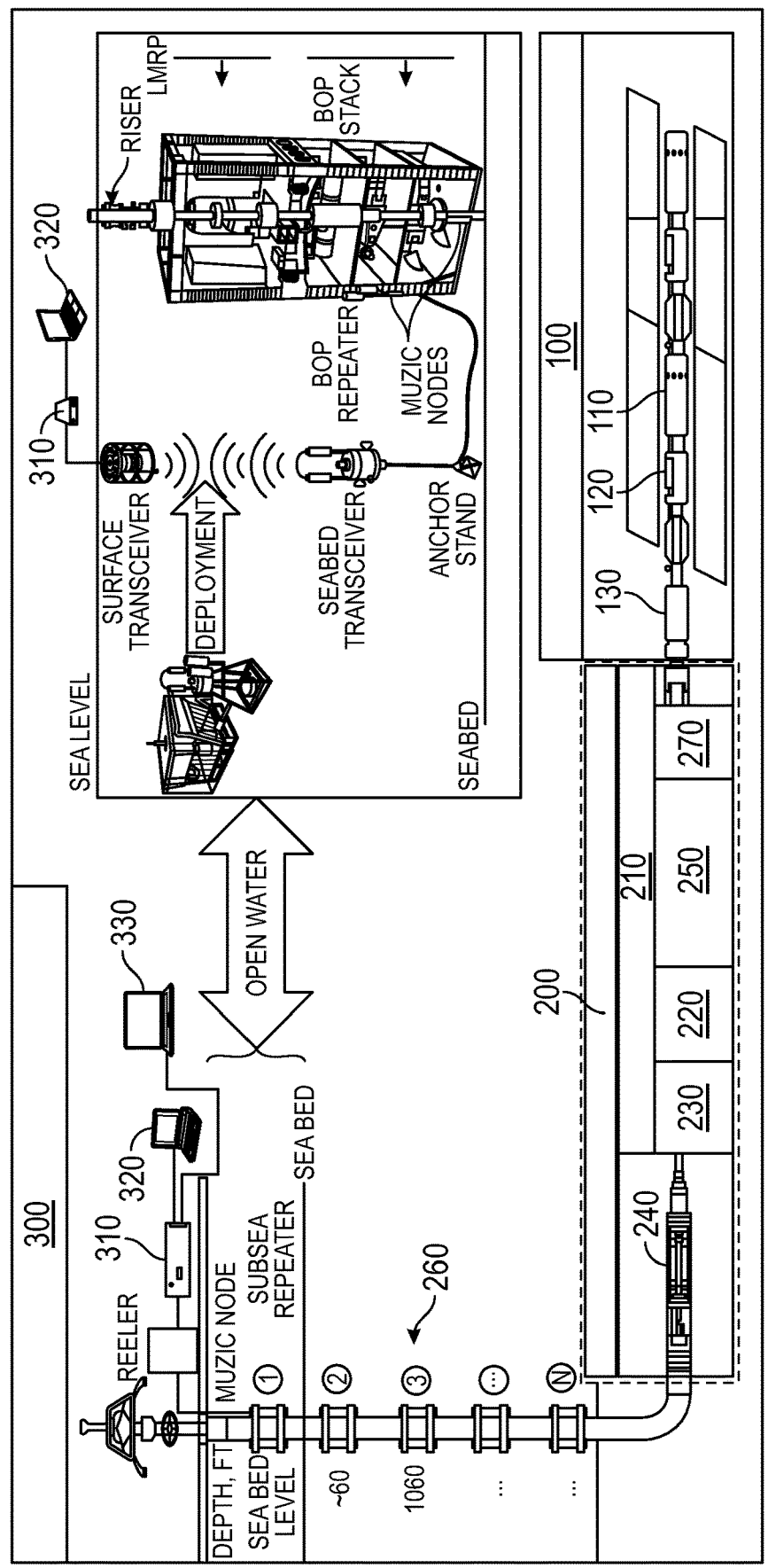
FIG. 1 illustrates an example overall wireless lower completion installation architecture.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

The present disclosure provides systems and methods for wirelessly deploying electrical lower completion tools or components. For example, the present disclosure provides a wet disconnect tool-running tool (WDT-RT). The WDT-RT provides a go/no-go service tool for electrical intelligent well completions. Systems and methods according to the present disclosure allow for bidirectional wireless telemetry between the surface and the electrical lower completion. Systems according to the present disclosure can include, for example, a wireless telemetry system (e.g., an acoustic wireless telemetry system, such as the Muzic system available from SLB), a battery pack, an electronic cartridge with a digital downhole computation and memory system, a DC-to-AC power supply, and/or sensors. The system can include a pressure compensator system to maintain positive pressure in chemical injection lines and/or to monitor the health and integrity of the chemical control lines. The battery pack can maintain power autonomy for several days. The sensors and/or computation and memory system can help monitor the health of the tool(s) and/or lower completion component(s).

The downhole computation system can enable real-time communication from downhole tools to the surface, thereby managing commands, downhole data storage, and transmission to the surface as desired or required. Wireless systems according to the present disclosure advantageously allow for data communication in real time, allowing for quick decisions and actions, and data storage for better understanding, for example, of packer setting profile and valve actuation. Incorporation of various sensors into the tool or system can allow for added value measurements, such as orientation, pressure, temperature, torque, shock, and vibrations, in real time and/or recording mode (via the downhole computation system).

FIG. 1 schematically illustrates an example overall wireless lower completion installation architecture. An electrical lower completion 100 is deployed in a wellbore. The electrical lower completion 100 can include, for example, one or more electric flow control valves 110 and/or gauges 120. The electrical lower completion 100 can include a coupler 130, e.g., a wetmate coupler, such as a hydro-electric wetmate coupler. The coupler 130 can be configured to couple to a WDT-RT 200 according to the present disclosure.

The WDT-RT 200 can include electronics 210 such as a master controller, which can perform downhole computations, sensors 220, such as pressure and/or temperature gauges, an energy source 230, and a modem 240 for wireless telemetry. In some configurations, the WDT-RT 200 can also include a power distribution and communication system 250 for the lower completion components, for example, the WellNet power supply and telemetry system available from SLB. In some configurations, chemical injection lines are routed from the WDT-RT 200 to the lower completion 100. The WDT-RT 200 can include a pressure compensator system 270 to maintain positive pressure in the chemical injection lines and/or to monitor the health and integrity of the chemical injection lines. A network of repeaters 260, e.g., flushed repeaters, can transmit telemetry signals between the WDT-RT 200 (e.g., the modem 240) and a surface acquisition system 300. The surface acquisition system 300 can include an acquisition computer 320 and/or a SCADA client 330, and an interface 310 that communicates or transmits signals to and/or from the acquisition computer 320 and/or SCADA client 330.

Figure 2:
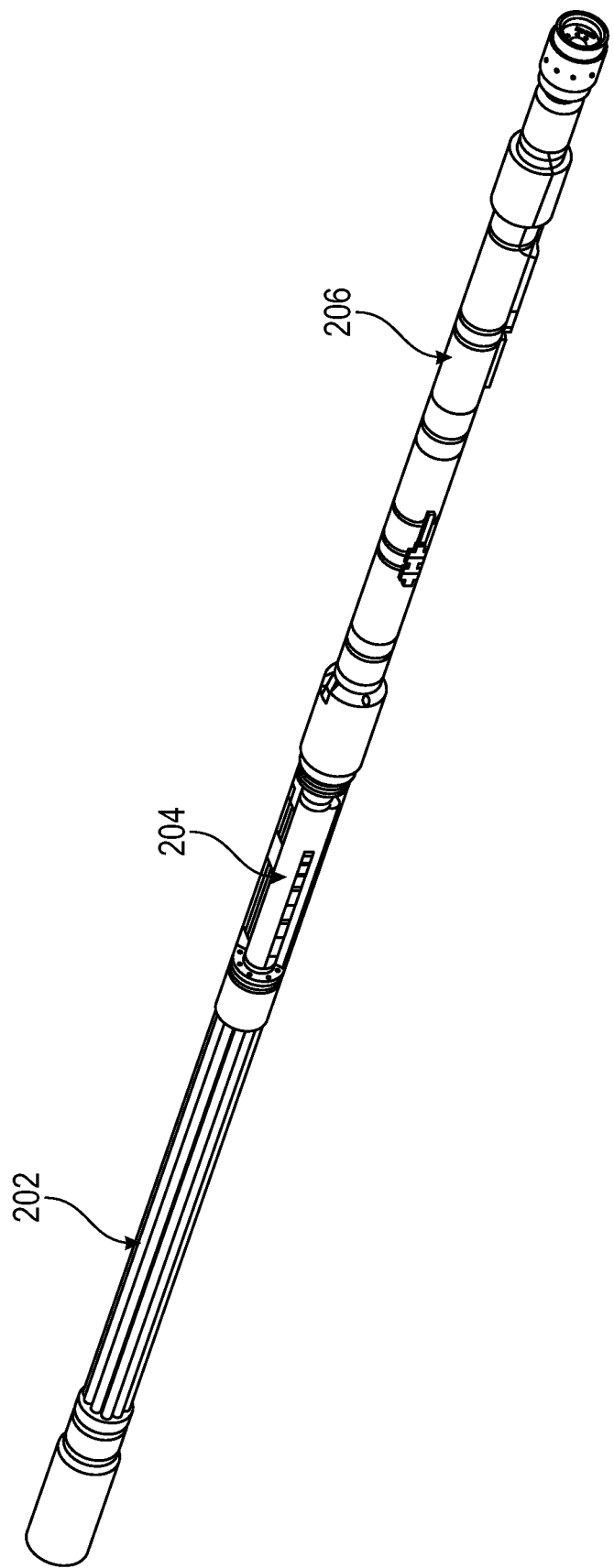
FIG. 2 illustrates an example wet disconnect tool-running tool architecture.

As shown in FIG. 2, the WDT-RT 200 architecture can include a battery and modem section 202, an electronics and sensors section 204, and a pressure compensator and control lines section 206. The WDT-RT 200 enables wireless real time communication between tools or components of the electrical lower completion 100 and the surface acquisition system 300.

Figure 3A:
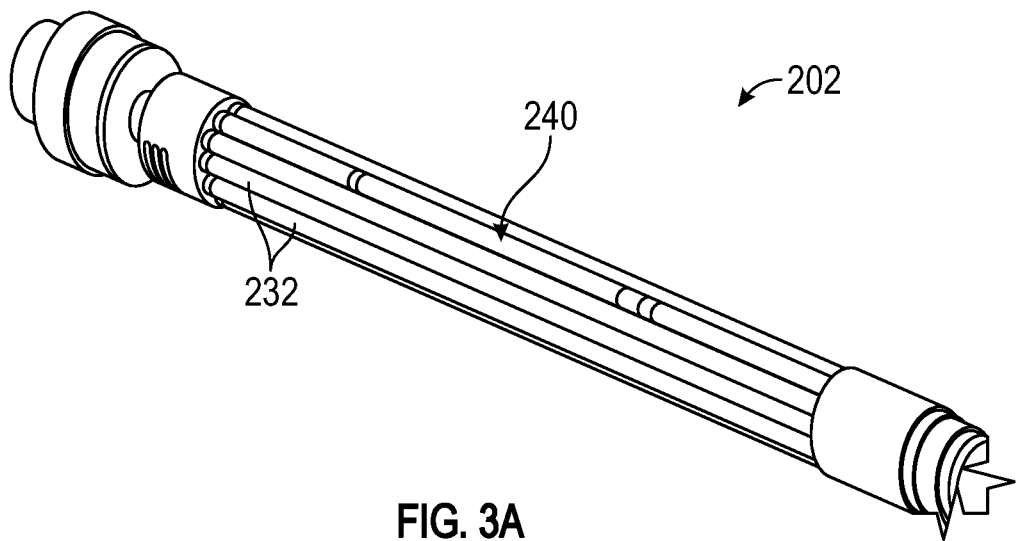
FIGS. 3A-3B illustrate a battery pack and telemetry section of the WDT-RT of FIG. 2.
Figure 3B:
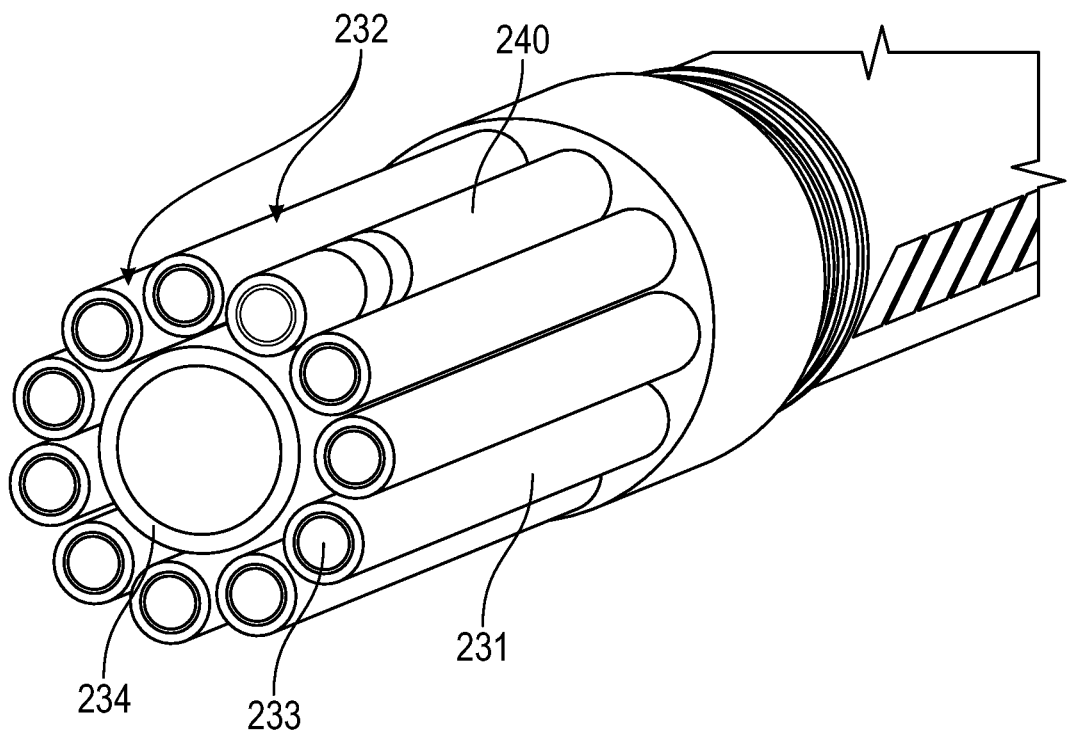

As shown in FIGS. 3A-3B, the battery and modem section 202 includes the energy source 230, for example in the form of one or more battery packs 232, and the modem 240. The battery packs 232 can include a plurality of battery cells 233, for example, commercially available battery cells. In some configurations, each battery cell 233 is encapsulated in an individual tube 231 as shown. Such individual encapsulation can allow for supporting the maximum annulus pressure. The modem 240, for example, a Muzic modem, can be integrated into the battery section 202 and wired to the electronic section 204. The battery packs 232 and modem 240 can have an elongated cylindrical or tube shaped structure. The battery packs 232 and modem 240 can be disposed circumferentially about the battery and modem section 202 as shown, for example, circumferentially about a central tubing or bore 234 of the battery and modem section 202.

Figure 4:
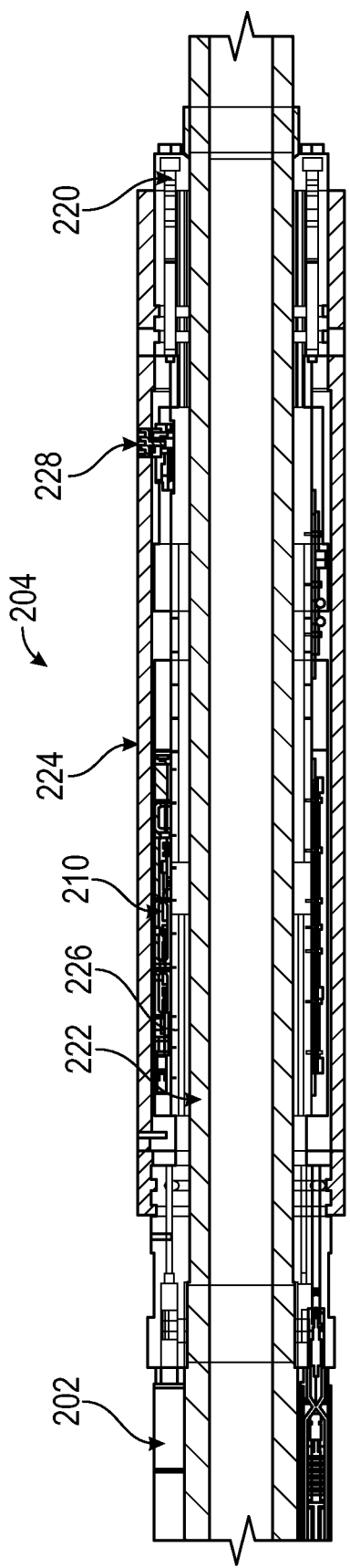
FIG. 4 illustrates an electronic chassis and sensors section of the WDT-RT of FIG. 2.

FIG. 4 illustrates the electronics and sensors section 204 of the WDT-RT 200. As shown, the electronic chassis 226 can be mounted on a mandrel 222. The electronics 210 are mounted or housed on the chassis 226. The electronics 210 are coupled to the battery and modem module 202 at one axial end and to one or more sensors 220 (e.g., a P/T sensor) and electrical connectors on the other axial end. A sleeve 224 can be disposed about (e.g., at least partially circumferentially about) at least a portion of the chassis 226 and electronics 210 to seal and create an air chamber for the electronics 210. The sleeve 224 is supported by the chassis 226, when under maximum pressure, to optimize slots for the electronics boards. This section 204 can include a Read Out Port (ROP) 228. The ROP 228 can be used to configure the tool before running in hole and dump data after completing installation of the electrical lower completion 100 tools. The chassis 226 can be designed to support the maximum pressure (e.g., 16,500 psi), but all other loads (e.g., tensile, compression, torque) can be taken or borne by the mandrel 222 on which the chassis 226 is mounted.

Figure 5:
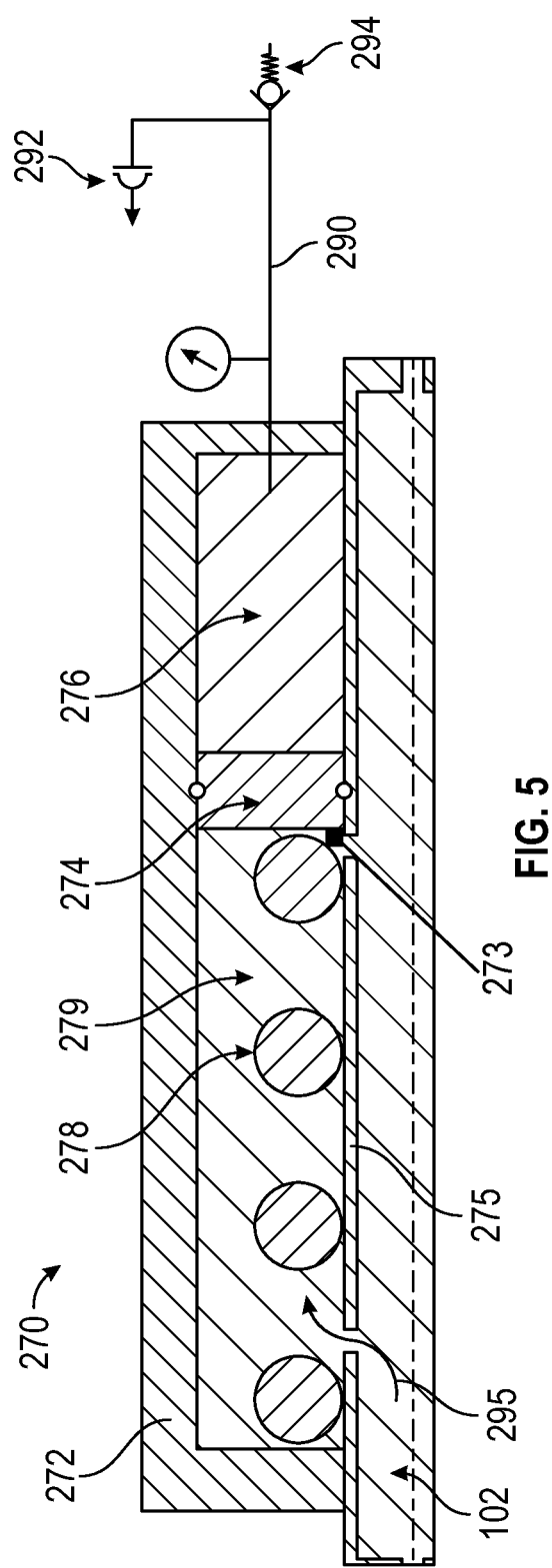
FIG. 5 illustrates a pressure compensator system of the WDT-RT of FIG. 2.

The pressure compensator section 206 includes an instrumented spring-based pressure compensation system 270, as shown in FIG. 5. The pressure compensation system 270 includes a housing 272, a mandrel 275, a piston 274, a fluid chamber 276, and a spring 278. The piston 274 is disposed within a chamber defined by an inner surface of the housing 272 and an outer surface of the mandrel 275. The fluid chamber 276 is formed, defined, or bounded by the inner surface of the housing 272, the outer surface of the mandrel 275, and one side of the piston 274. The spring 278 is disposed within a spring chamber 279 formed, defined, or bounded by the inner surface of the housing 272, the outer surface of the mandrel 275, and an opposite side of the piston 274. The chemical injection line(s) 290 are coupled to the fluid chamber 276. A rupture disc 292 and/or pressure relief valve 294 can be located along or coupled to the chemical injection line(s) 290. The chemical injection line(s) 290 are also coupled to an injection mandrel, the output of which is connected to the tubing.

The tubing pressure 102 can communicate with the spring chamber 279, for example via a port along arrow 295 as shown in FIG. 5. The fluid communication between the tubing 102 and spring chamber 279 allows the pressure compensation system 270 to compensate for the hydrostatic or tubing pressure 102. The pressure compensation system 270 advantageously adds a positive pressure in chemical injection lines 290, compensates for thermal expansion or contraction, compensates for hydrostatic and/or applied pressure from surface to tubing 102, and keeps a differential pressure between the tubing 102 and control line or chemical injection line(s) 290 within a desired range, for example, about 2,000 psi. Leakage in the chemical injection lines 290 can be detected with the addition of extra high resolution and accurate sensors. The pressure compensator system 270 can be designed to promote and monitor positive pressure in the chemical injection lines 290 even at extreme temperature conditions (e.g., 0° C.-150° C.).

Before running in hole, the fluid chamber 276 is filled, which moves the piston 274 toward the spring chamber 279 (toward the left in the orientation of FIG. 5). The piston 274 may move left until the piston 274 contacts a shoulder 273 on the mandrel 275. In some configurations, this compresses the spring 278. The pressure (in the fluid chamber 276 and/or injection lines 290) increases until it cracks the relief valve 294, limiting the initial pressure in the chemical injection lines 290, for example to around 1100 psi in some configurations. During descent as the WDT-RT 200 is run in hole, fluid in the chemical lines 290 contracts, and the piston 274 moves toward the fluid chamber 276 (toward the right in the orientation of FIG. 5) to compensate for the volume change. At this stage, the differential pressure in the chemical lines 290 is provided by the spring 278. As the lines 290 enter the well and heat up, the fluid expands, again moving the piston 274 toward the left against the spring 278 until the piston 274 contacts the shoulder 273, and the relief valve 294 may crack again.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A wet disconnect tool-running tool comprising:
   a battery and telemetry section;
   an electronics and sensors section; and
   a pressure compensator section comprises a spring-based pressure compensator system, wherein the spring-based pressure compensator system is configured to add positive pressure in chemical injection lines, compensate for thermal expansion and/or contraction, compensate for hydrostatic and/or applied pressure from surface to tubing, and maintain a differential pressure between the tubing and the chemical injection lines within a desired limit.

2. The tool of claim 1, wherein the battery and telemetry section comprises a modem for acoustic wireless telemetry.

3. The tool of claim 2, wherein the modem is wired to the electronics and sensors section.

4. The tool of claim 1, wherein the battery and telemetry section comprises a plurality of battery cells, each of the plurality of battery cells encapsulated in an individual tube.

5. The tool of claim 4, wherein the plurality of battery cells are disposed circumferentially about a central core or mandrel of the battery and telemetry section.

6. The tool of claim 5, wherein the battery and telemetry section comprises a modem for wireless telemetry, and the modem is disposed alongside and/or parallel to the plurality of battery cells.

7. The tool of claim 1, wherein the electronics and sensors section comprises an electronic chassis mounted on a mandrel, and a sleeve mounted on the chassis to seal and create an air chamber for the electronics.

8. The tool of claim 1, wherein the electronics and sensors section comprises a read out port.

9. The tool of claim 1, wherein the electronics and sensors section comprises a pressure/temperature sensor.

10. The tool of claim 1, wherein the spring-based pressure compensator system comprises:
    a mandrel;
    a housing;
    a piston;
    a spring;
    a fluid chamber defined by the mandrel, the housing, and one side of the piston; and
    a spring chamber defined by the mandrel, the housing, and an opposite side of the piston, the spring disposed in the spring chamber,
    wherein the chemical injection lines are coupled to the fluid chamber.

11. The tool of claim 10, wherein the fluid chamber is filled with fluid prior to use, wherein filling the fluid chamber moves the piston toward the spring chamber, thereby compressing the spring, to limit pressure in the chemical injection lines.

12. The tool of claim 11, wherein as the fluid contracts in use, the spring expands to move the piston toward the fluid chamber to compensate for fluid volume loss.

13. The tool of claim 12, wherein as the fluid re-expands in use, the piston is forced toward the spring chamber against the spring.

\* \* \* \* \*